United States Patent [19]

Tu et al.

[11] Patent Number: 5,071,609
[45] Date of Patent: Dec. 10, 1991

[54] PROCESS OF MANUFACTURING POROUS MULTI-EXPANDED FLUOROPOLYMERS

[75] Inventors: Roger H. Tu, Lake Forest; Wilfred F. Mathewson, Dana Point; Mark A. Roberts, Costa Mesa, all of Calif.

[73] Assignee: Baxter International Inc., Deerfield, Ill.

[21] Appl. No.: 266,745

[22] Filed: Nov. 3, 1988

Related U.S. Application Data

[63] Continuation-in-part of Ser. No. 934,956, Nov. 26, 1986, abandoned.

[51] Int. Cl.$^5$ .................. B29C 55/22; C08F 14/26
[52] U.S. Cl. ................... 264/119; 264/127; 264/288.8; 264/289.3; 264/290.2; 428/422; 526/255
[58] Field of Search ............... 264/505, 567, 127, 154, 264/175, 235.6, 288.8, 289.3, 290.2, 290.5, 210.7, 119; 428/398, 422; 526/255

[56] References Cited

U.S. PATENT DOCUMENTS

| | | | |
|---|---|---|---|
| 2,586,357 | 2/1952 | Llewellyn | 524/546 |
| 3,953,566 | 4/1976 | Gore | 264/505 |
| 3,962,153 | 6/1976 | Gore | 264/127 |
| 4,110,392 | 8/1978 | Yamazaki | 264/127 |
| 4,187,390 | 2/1980 | Gore | 264/288.8 |
| 4,248,924 | 2/1981 | Okita | 264/288.8 |
| 4,555,543 | 11/1985 | Effenberger et al. | 428/422 |

Primary Examiner—Mary Lynn Theisen
Attorney, Agent, or Firm—Michael C. Schiffer; Debra D. Condino

[57] ABSTRACT

Interpenetrated matrix of polytetrafluoroethylene and elastomer is disclosed. The matrix is formed into a composite material which is flexible, durable, highly porous with a tight microporous structure and improved retractability. The composite material is subjected to a multi-expansion process to produce shaped articles such as films, tubes, rods and filaments with excellent flexibility and elasticity. More particularly, the composite material can be utilized to produce vascular grafts with excellent biological compatibility.

23 Claims, 5 Drawing Sheets

PROCESS OF MANUFACTURING POROUS MULTI-EXPANDED FLUOROPOLYMERS

This is a Continuation-in-Part of application Ser. No. 934,956, filed on Nov. 26, 1986, now abandoned.

BACKGROUND OF THE INVENTION

The present invention is directed to microporous poly(tetrafluoroethylene)/elastomer vascular grafts which have intrinsic elasticity, and methods of preparing the same. Specifically, the present invention is directed to an expanded porous, poly(tetrafluoroethylene)/elastomer vascular graft formed by the respective curing and sintering of the elastomer and poly(tetrafluoroethylene) in a two step manner to impart intrinsic elasticity to the elastomer portion of the graft.

Co-pending application Ser. No. 892,271, now abandoned, entitled "POROUS HIGHLY EXPANDED FLUOROPOLYMERS PROCESS THEREFOR", incorporated herein by reference, discloses the use of elastomers for strengthening expanded poly(tetrafluoroethylene), also known as PTFE, articles. It is believed that the elastomer coats the PTFE fibrils, and forms a continuous matrix interpenetrating the microstructure of the fibrils. In so doing, it renders the poly(tetrafluoroethylene) structure porous, yet durable with excellent pliability for use as a vascular graft. More importantly, the addition of an elastomer to the poly(tetrafluoroethylene) provides a material from which vascular grafts can be made which is biological compatible with the patient's tissue surrounding the graft after implantation.

While the process disclosed in U.S.S.N. No. 892,271 can be used to formulate poly(tetrafluoroethylene)-elastomer articles, the present invention relates to a process and product where there is an improvement in the compliance, elasticity, flexibility and strength of the poly(tetrafluoroethylene)-elastomer article due to a novel expansion, and sequential curing and sintering of the elastomer and PTFE. The present invention relates to rods, tubes, sheets, or any products produced thereby, but more particularly relates to shaped articles which are useful as medical implants. The invention, as described herein, emphasizes the process as directed to produce medical implants or specifically, vascular grafts, which have the improved physical characteristics, but should not be limited to exclude the application of the process for other products.

It is generally difficult to manufacture a highly porous poly(tetrafluoroethylene) material by the expansion of the PTFE at a very high ratio in a single expansion step. The fibrils, which are fragile, may not develop completely before being torn during the expansion process. Those processes using PTFE require that the PTFE article be stretched multiple times. These processes provide for an expanded PTFE article, and particularly vascular grafts having the desired microporosity not achieved by the use of PTFE alone.

Examples of processes which perform multiple expansion of PTFE articles, including vascular grafts, are disclosed in U.S. Pat. Nos. 2,586,357, 3,953,566, 3,962,153, 4,110,392, 4,248,924, and Japanese patent publication No. 13560/1967. Japanese patent number 13560/1967, discloses a process of producing porous articles of PTFE by the paste forming extrusion of PTFE product which is stretched more than once. The stretched article, as exemplified a sheet, is then sintered. This reference further teaches the impregnation of the formed PTFE sheet with an elastomer, which elastomer is cured. The Pat. No. 3,962,153 describes a conventional process for stretching poly(tetrafluoroethylene) materials at a rate exceeding 2000% per second to a final length of up to 1760 times the original length of the material. Another multiple stretching process is disclosed in U.S. Pat. No. 4,110,392, wherein a PTFE article is first stretched, while in the unsintered state, then free sintered, followed by a second stretching.

Conventional vascular grafts manufactured from poly(tetrafluoroethylene), which has been expanded to provide for the microporosity, often possess limitations in strength and compliance. The expanded, porous grafts do not hold or resist dilation unless wrapped with a re-enforcing film or fiber for support. This is because of the relatively low radial tensile strength of poly(tetrafluoroethylene). The reinforcement slows down the tissue ingrowth preventing rapid healing. In addition, the grafts are stiff and non-compliant in relation to a natural artery. A porous flexible structure that is closer in compliance to a natural vessel will help prevent the complications resulting from the aforementioned detrimental characteristics.

As stated, the incorporation of an elastomer into the PTFE matrix, by the blending of the PTFE and elastomer, and then forming the desired article, as taught by the Co-pending application Ser. No. 892,271, provides a strengthened PTFE product. Another reference which teaches the general incorporation of a specific elastomer, a fluoroelastomer, is disclosed in U.S. Pat. No. 4,555,543.

While these later references teach the use of an elastomer, which is blended into the poly(tetrafluoroethylene) resin, the resulting article is still manufactured by the multiple stretching techniques discussed in the above patent references. These techniques provide that the article is stretched numerous times, with the final article being sintered. While the resulting product possess some elastic memory due to the presence of the elastomer, it would be even more advantageous to provide the article with an elastomeric component which would inherently resist the application of any applied stress.

SUMMARY OF THE INVENTION

The present invention is directed to a process which advantageously provides an article formed from a blend of an elastomer and PTFE with intrinsic elasticity. This intrinsic elasticity is provided by the process of the invention wherein the vascular graft is formed by setting the elastomer and the polytetrafluoroethylene at two separate degrees of expansion ration. That is, the elastomer is cured after the article has been placed in a first degree of expansion, and then subsequently sintering the polytetrafluoroethylene while the article is allowed to assume a second degree of expansion. This is generally carried out by curing the elastomer and sintering the polytetrafluoroethylene in two separate, and sequential steps, while maintaining the article under two different degrees of expansion.

In general the process of the invention includes the following steps: (1) forming a tubular structure from a blend of polytetrafluoroethylene and at least one elastomer; (2) heating the tubular structure to a temperature, for a period of time insufficient to cure the elastomer; (3) expanding the tubular structure; (4) maintaining the tubular structure in the expanded state; (5) heating the structure to a temperature for a sufficient period of time to cure the elastomer; and (6) heating the structure to a temperature for a sufficient period of time to flash sinter the polytetrafluoroethylene while allowing the tubular structure to assume a new state of expansion. This new state of expansion can be provided by releasing the tubular structure from its expanded position, maintaining the tubular structure in its expanded position, or performing a second expansion step on the tubular structure after curing the elastomer. Furthermore, the tubular structure can also be expanded after the sintering of the polytetrafluoroethylene.

DETAILED DESCRIPTION OF THE INVENTION

Figure 1:
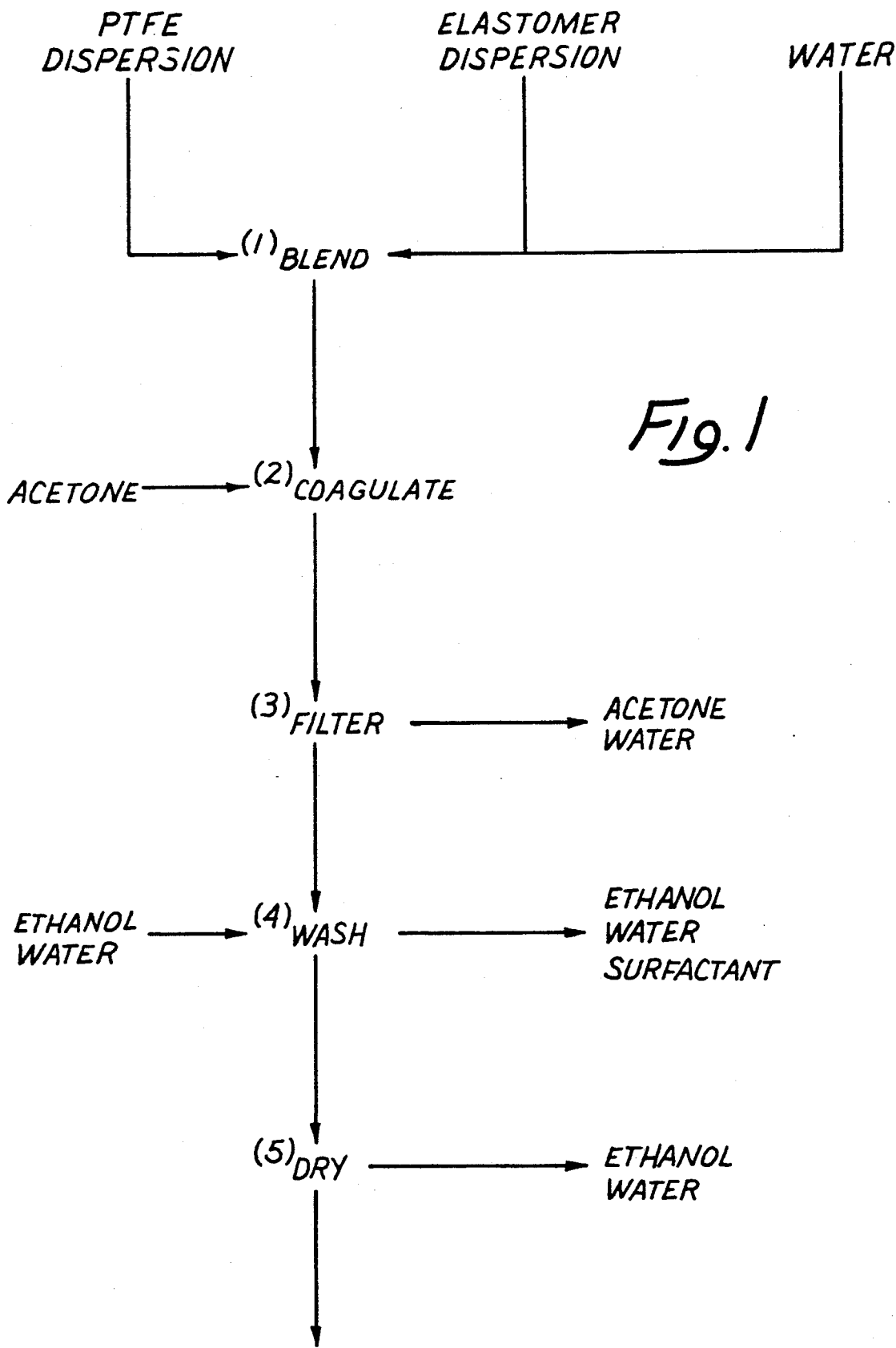
FIGS. 1 and 2 are schematic representations of the process of this invention.

The present invention is directed to a process of forming porous poly(tetrafluoroethylene)-elastomer articles, and in particular vascular grafts using the PTFE/elastomer blends described more fully in co-pending application No. 892,271, with the description of the blends, and the methods of forming such blends and the vascular grafts being incorporated herein by reference. The process of the invention includes the expansion or stretching of the formed vascular grafts, in combination with a novel sequential curing the elastomer and sintering the PTFE. to form such vascular grafts with intrinsic elasticity.

By "intrinsic elasticity" it is meant that the article is formed to place the elastomer under a degree of stress. Specifically, the elastomer is cured so as to be set while the article is under a first position of expansion, with the polytetrafluoroethylene sintered in a manner to place the article in a second position of expansion. The elastomer is thus either compressed or stretched while sintering the polytetrafluoroethylene to set the article in the second position of expansion. The compressed or stretched elastomer thus possesses an intrinsic elasticity, such that when the vascular graft, or other article prepared in accordance with the invention is placed under subjected to stress by pulling or compressing the article, the cured elastomer resists the applied stress.

As will be described more fully herein, this intrinsic elasticity is provided by first curing the elastomer after the article has been expanded to a first position. The second position may be obtained by sintering the poly-tetrafluoroethylene while holding the article either completely or partially in the first expanded position, or by sintering the article while releasing the article, or by further expanding the article and either holding the article either completely or partially in this second expanded position. In any of the described scenarios the polytetrafluoroethylene will retract as it is being sintered to place the article in the second expanded position. The degree to which the polytetrafluoroethylene retracts is dependent upon whether the article is held or released from the first expanded position. In accordance with a still further embodiment, the article can be further stretched after the polytetrafluoroethylene has been sintered to place the elastomer under further stress, that is, increase the intrinsic elasticity. This is possible since a characteristic of polytetrafluoroethylene is that it can be stretched to a different position even after having been sintered.

The polytetrafluoroethylene-elastomer blends taught in accordance with the teachings of U.S.S.N. No. 892,271 are particularly useful for the practice of the present invention. That is, the preparation of paste formed, dried unsintered shapes using the blends taught by this incorporated reference, which are then expanded by stretching in one or more directions, at least one time under conditions which ensure that the elastomer cures prior to the sintering of the polytetrafluoroethylene provides improved medical implants with a tight microporous structure having intrinsic elasticity. The blends taught by the incorporated reference provide for the addition of one or more elastomers to a poly(tetrafluoroethylene) resin prior to forming the desired shape.

The elastomer may be any of the thermosetting elastomers, and is preferably selected from the group consisting of polyvinylidene fluoride co-hexafluoropropylene, poly(tetrafluoroethylene-co-perfluoro(methylvinylether)), poly(tetrafluoroethylene-co-propylene), poly(vinylidene-co-chlorotrifluoroethylene), silicones, fluorosilicones, fluoroalkoxy phosphazenes, segmented copolyester ether, styrene butadiene block copolymers, polyethers, acrylonitrile butadienes, isoprenes and mixtures thereof.

The elastomer is added to the poly(tetrafluoroethylene) in an amount sufficient enough to provide the intrinsic elasticity to an article formed in accordance with the invention, preferably, this amount is in the range of from about 2 weight % to about 50 weight % of the shaped article, preferably from about 10 to about 30 weight %, and even more preferably, about 10 weight % of the shaped article. While the incorporation of only one elastomer is suitable for the practice of the invention, it should be noted that for certain applications it may be even more desirable to add more than one elastomer to the poly(tetrafluoroethylene), but not more than two, with the total weight % of the combined elastomers being within weight percent ranges discussed above.

While any of the aforementioned elastomers are suitable for the practice of the invention, a co-polymer of propylene and tetrafluoroethylene, poly(tetrafluoroethylene-co-propylene)sold under the tradename Aflas, manufactured by Asahi Glass Company, is preferred.

As stated, the process taught in the incorporated herein co-pending patent application, U.S.S.N. No. 892,271, can be utilized in accordance with the invention to prepare the PTFE/elastomer blends useful for preparing the porous, expanded products. However, any conventional process which obtains an unsintered molded article, by the extrusion of a PTFE/elastomer blend, may be utilized with the process of the invention, to produce a microporous, PTFE/elastomer vascular graft, or other article, having the unexpected results of the present invention.

Accordingly, the polymeric blend of this invention may be obtained by combining dispersions or emulsions of poly(tetrafluoroethylene) and the elastomer and coagulating the blend. Dispersions of poly(tetrafluoroethylene) should contain about 10 to about 50% poly(tetrafluoroethylene) in water. Preferably, about 25% by weight is utilized. The elastomer dispersion should contain about 10 to 50% by weight of the elastomer. Preferably about 25% by weight of the elastomer dispersion is utilized to provide a mixture with the poly(tetrafluoroethylene) in the blended dispersions. The amounts of each of the poly(tetrafluoroethylene) and elastomer dispersions to form the blended dispersion may be varied so that the elastomer may be present in the polymetric matrix to achieve the desired weight percentages discussed above in the final product.

As taught by the incorporated reference, the blending of the polytetrafluoroethylene and elastomer may be performed by numerous methods. For example, the poly(tetrafluoroethylene) in dry powder form, may be admixed with a dispersion or emulsion of an elastomer. The elastomer may be dispersed in a solvent and sprayed on the poly(tetrafluoroethylene) powder, while tumbling the powder. The spraying should be accomplished on an intermittant basis to avoid lumping. As also taught by this patent a lubricant may be added to the blend, or added previously to the poly(tetrafluoroethylene). Regardless of the source of the poly(tetrafluoroethylene), the blended poly(tetrafluoroethylene)-elastomer-lubricant mixture is left to stand to allow for sufficient dispersion of the lubricant.

The resulting blend is then molded by extrusion, rolling or a combination thereof. Typically, the blend is molded by a paste extrusion process, wherein the blend is compressed to form a preform or billet, which preform is extruded under conventional conditions of elevated temperature and pressure through an appropriately configured die.

After the article has been formed by the selected molding process, e.g. a paste extrusion process, the article is heated, preferably uniformly, to a specified temperature prior to the first expansion procedure. The temperature selected should be below the curing temperature of the elastomer, and should be maintained sufficiently long enough to cause the blend to flow or become pliable. This will promote the ease by which the formed article, in this case the vascular graft, can be expanded which is typically performed by pulling the article in a desired direction. This temperature may be between 35° C. to 342° C. depending upon the elastomer. In certain applications it may be necessary to heat the article above the curing temperature of the elastomer in order to perform the initial expansion, however, this temperature should not be maintained for any period of time which would cause the curing of the elastomer.

The expansion of the extruded article may be performed in any desired direction, and by any technique. In accordance with the preferred embodiment, that is the preparation of a vascular graft, the extruded article may be expanded in the longitudinal direction, that is in a direction parallel with the graft axis, or in a radial direction, that is in a direction substantially perpendicular to the graft axis, or both. The expansion is typically performed by mounting the article, i.e. graft, on a support which either grips the article at the ends for longitudinal expansion, or fits inside the graft for radial expansion.

Expansion in the longitudinal direction elongates the nodes, the longer axis of a node being oriented perpendicular to the direction of expansion. The PTFE fibrils become oriented in a direction parallel to the direction of expansion.

The rate of this expansion or stretch may vary, and is not intended to be limiting to any of the expansion steps which are described herein. When the article is being expanded in the longitudinal or radial direction, the rate of expansion can vary in a range of about ten to about one-hundred percent per second, preferably from about ten to about fifty percent per second, and more preferably at a rate of stretch of about ten percent per second. The total ratio of the expansion or stretch may also vary in a range of from about two-hundred to about six-hundred percent of the original length, if the expansion is in the longitudinal direction, or of the original radius, if the expansion is in the radial direction.

After the first expansion or stretch, the article is heated to a temperature which is sufficient enough, and for a sufficient period of time to cure the elastomer, with the temperature for most elastomers being in the range of 150° C. to 200° C., which is held for about 30 minutes. Generally the temperature and time period selected for curing the elastomer should be sufficient enough to provide for a desire percentage of cross-linking in the elastomer. It is believed that the desired cross-linking should be from about eighty to about one-hundred percent of the available cross-linking sites in the elastomer. Furthermore, the selected temperature and time period for curing the elastomer should be below that temperature and time period which would effect the sintering of the poly(tetrafluoroethylene).

In accordance with one embodiment of the invention, after the elastomer is cured the article is heated to a temperature for a period of time to cause the sintering of the poly(tetrafluoroethylene). This temperature will typically be in the range of 327° C. to about 360° C., more preferably 327° C., and is maintained for about 1 to about 10 minutes, more typically about 5 minutes. The sintering is carried out in such a manner so as to cause the article to constrict, that is, shrink partially back in the direction in which it was stretched during the expansion step. Typically, the article shrinkage would fall in the range of from about ten to about fifty percent of the original ratio of expansion. However, the percent of shrinkage is dependent upon the type of elastomer used, the ratio of expansion, and the temperatures and times used to perform the curing and sintering.

Furthermore, the article may be either held completely or partially in the expanded position, or released to allow for a maximum degree of shrinkage. Preferably, the article is first subjected to the sintering temperature for less than the entire period of time under which it will be subjected to such temperature, while being held in the completely expanded position. This may be performed by placing the expanded article on a support which either holds the ends of the article, i.e. the graft, to maintain a longitudinal expansion, or fits within the article, i.e. graft, to maintain a radial expansion.

Subsequently, the article is at least partially released while the sintering temperature is maintained for the remainder of the sintering time period to allow for some shrinkage of the article. This may be performed by releasing one end of the article while the sintering is continued, or the degree to which the article is being held in the radial direction may be reduced.

For certain applications the article may be left unsupported during the entire sintering step in order to achieve more shrinkage. The precise degree of shrinkage is dependent upon the desired intrinsic elasticity for the article. In this regard, the more shrinkage, the more intrinsic elasticity is obtained, however, for certain applications it is desired to minimize this shrinkage and thus the overall intrinsic elasticity.

In accordance with a more preferred embodiment of the invention, a second expansion step is performed after the curing of the elastomer, but before the sintering of the poly(tetrafluoroethylene). The second expansion step may be performed at any of the above specified expansion rates, with the total expansion ratio for all such expansions being as described above. This expansion step is performed at a temperature, and for a time period, which will not degrade the elastomer, nor cause the elastomer to become unset. This temperature will again fall with the range of from about 35° C. to about 327° C. The article may be stretched up to a combined total of three to about twenty times its original length in the combined expansion steps.

The temperature selected for this second expansion should also preferably be maintained just below the melt point of the poly(tetrafluoroethylene). Conventional teachings suggest that the heating of the poly(tetrafluoroethylene) to this temperature causes an annealing of the poly(tetrafluoroethylene) which improves the resin in the expansion process.

After the second expansion, the article is sintered in a manner as described above. However, in a preferred embodiment, it is preferable to maintain the article, after the second expansion, in the fully expanded position throughout the entire sintering step.

The tight microporous structure obtained by the process of this invention is composed of finely oriented fibrils of poly(tetrafluoroethylene) coated with the elastomer. The elastomer encapsulates and reinforces the poly(tetrafluoroethylene) fibrils, the the fibrils being interconnected at nodes. The exact arrangement and structure of PTFE materials, that is the construction of the fibril matrix with the interconnecting nodes is known, and will not be described in any detail herein. The elastomer becomes a continuous matrix interpenetrating the microstructure of the fibrils, however, the elastomer does not fill in the voids provided by the fibril matrix so as to render the matrix non-porous. This is in contrast to other processes wherein a poly(tetrafluoroethylene) matrix is impregnated with an elastomer emulsion or dispersion, with the elastomer being cured in the matrix.

In accordance with the described process the elastomer modifies the sharp edges of the poly(tetrafluoroethylene) fibrils and nodes to render the edges smooth. The smooth edges of the fibrils and nodes create a poly(tetrafluoroethylene) elastomer product resistant to suture tearing, with the process of the invention providing the resulting article with the intrinsic elasticity.

The expansion of the PTFE-elastomer article causes a reorientation of the PTFE fibrils. Expansion in only one direction, either longitudinally or radially, causes the nodes to become oriented perpendicular to the direction of expansion. The fibrils which interconnect the nodes become oriented parallel to the direction of expansion. In photomicrographs of PTFE, as seen in the several figures, the fibrils appear to be characteristically wide in cross-section, with the nodes having a size from about 5 microns to about 50 microns, depending on the conditions used in the expansion, and the amount and type of elastomer added to the poly(tetrafluoroethylene).

Articles prepared in accordance with the process of the invention have a specific gravity ranging from about 0.2 to about 1.3, preferably about 0.6 and a porosity ranging from about 40% to about 90% void. The porosity allows for tissue ingrowth without allowing red blood cells to pass through the walls of the graft. The porous structure is opaque, however permeable to gases. The grafts are biologically compatible, in that they function within normal biological actions and are not rejected. The elastomer present in the article, and particularly in a graft, absorbs the kinetic energy of pulsating blood providing durability to the graft that is missing in conventional grafts made from poly(tetrafluoroethylene), and even grafts prepared from poly(tetrafluoroethylene)-elastomer blends. This ability to absorb the kinetic energy is a direct result of providing the article with the intrinsic elasticity by curing the elastomer prior to the sintering of the poly(tetrafluoroethylene).

An article prepared in accordance with the present invention will also have a matrix tensile strength in the range of 6000-7000 p.s.i. In Example 3, which follows, a method for calculating matrix tensile strength is described in more detail. An article prepared in accordance with the invention, unlike prior art devices, is not stiff, and possesses the characteristic compliance, pliability, durability and biological compatibility, needed to enable it to function as a medical implant.

Figure 2:
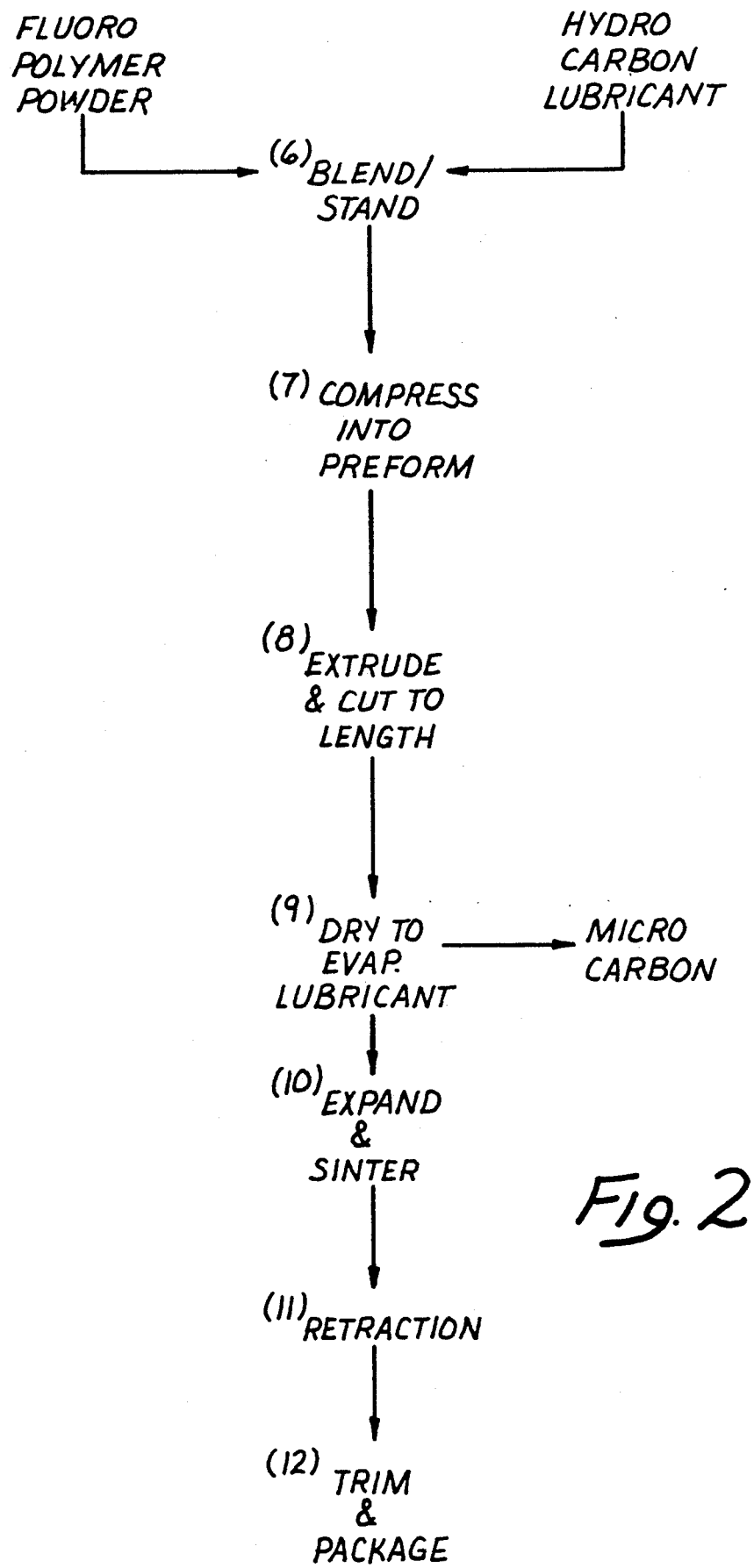

Referring now to FIGS. 1 and 2, a preferred process in accordance with the invention will be described.

Step 1—Blending: Aqueous dispersions of poly(tetrafluoroethylene) and a fluoroelastomer are blended with very mild stirring. The aqueous dispersion of the elastomer contains about 25% by weight elastomer, such as Aflas, while the dispersion of the poly(tetrafluoroethylene) resin contains about 25% by weight of the poly(tetrafluoroethylene).

Step 2—Coagulating: The blended dispersion is then coagulated by adding acetone while agitating vigorously. The coagulum floats to the top.

Step 3—Filtering: The coagulum is vacuum filtered to remove as much water and acetone as possible.

Step 4—Washing: The filtered coagulum is then washed repeatedly with ethanol and water to extract any surfactant which might have been present in either the elastomer or poly(tetrafluoroethylene) dispersions.

Step 5—Drying: After washing the coagulum, now a powder, it is dried to volatilize any entrapped water or ethanol.

Step 6—Blending/Compounding: The poly(tetrafluoroethylene)/elastomer blend, which is now in powder form is combined with about 10 to 30% by weight of a hydrocarbon which will serve as a lubricant. Suitable hydrocarbon lubricants include kerosene, mineral spirits, alcohol, glycol, and aromatics. The blended powder must stand several hours for uniform lubricant dispersion.

Step 7—Preforming: The lubricated powder is placed into a cylinder with a core rod in the center. The powder is then compressed to 300 to 500 p.s.i. which forms a solid form called a preform or billet.

Step 8—Paste Extrusion: The preform is placed in an extruder which under hydraulic pressure forces the material out of the die in the form of a cylindrical body. The cylindrical body is then cut into sections of predetermined lengths.

Step 9—Expansion: The individual cylindrical bodies are dried to evaporate the lubricant. The cylindrical bodies are heated to a temperature below the elastomer curing temperature, or if above the curing temperature for a period of time insufficient to effect the curing of the elastomer to any degree which would in effect set the elastomer, this temperature is usually within a range of about 35° C. to about 327° C. The cylindrical bodies are expanded a first time within the foregoing temperature range. This expansion may be either in the longitudinal or radial direction.

Step 10—Curing: After this first expansion, the bodies are subjected to a temperature at which the elastomer will be cured, that is a temperature at which a desired degree of cross-linking, generally from about 80% to 100% cross-linking, is achieved. For most elastomers this temperature is in the range of about 150° C. to about 200° C., and is maintained for about 10 to about 30 minutes.

A catalyst may have been originally added to the poly(tetrafluoroethylene/elastomer blend in order to reduce the curing time of the elastomer. Any catalyst known to cure the selected elastomer may be utilized, however peroxides are preferred. Most preferred is alpha, alpha'-bis(tertbutylperoxy)-diisopropylbenzene. The catalyst may be added in amount ranging from 0.1% to about 10% by weight of elastomer. The bodies may be expanded a second time.

Optional Step 11—Second Expansion: The cylindrical bodies are again heated to a temperature below the elastomer curing temperature, or if above the curing temperature for a period of time insufficient to effect the now cured elastomer, this temperature is usually within a range of about 35° C. to about 327° C. The cylindrical bodies are expanded a second time within the foregoing temperature range. This expansion may be either in the longitudinal or radial direction.

Step 12—Flash sintering: The now expanded bodies are inserted into a oven which has been preheated to a temperature ranging from 327° C. to 360° C. for a relatively short period of time, that is from about 1 to about 10 minutes. During this step the bodies may either be allowed to rest in the oven in an unrestricted manner, or be held in the expanded position on a sintering rack which grips the cylindrical bodies respective ends.

Alternatively, the cylindrical bodies are flash sintered for three minutes, followed by releasing one end of the sintered cylindrical body, and continuing the sintering for another three minutes. Furthermore, the cylindrical bodies can be flash sintered while releasing the body from its stretched position after curing the elastomer.

In an still further embodiment of the invention, the cured and sintered cylindrical body is subjected to an additional expansion step. The sintered, or set polytetrafluoroethylene is capable of being stretched even after having been sintered. This increases the intrinsic elasticity of the elastomer.

As stated above the cylindrical bodies prepared in accordance with that embodiment of the invention wherein the cylindrical bodies are allowed to contract by not being restricted either completely or partially during the sintering step can contract to about 50% of their original expanded length, whereas a conventional poly(tetrafluoroethylene) tube without elastomer, or which is prepared without first curing the elastomer, shrinks to its original pre-expansion length. Contraction of the cylindrical body, or any other body type, in combination with the curing of the elastomer after the first expansion and prior to the sintering, provides the resulting body with increased flexibility and compliance. This is believed to result for the inability of the fibrils to freely retract during sintering step due to the presence of the cured elastomer.

The following examples describe processes and products in accordance with embodiments of the invention as well as further description of the properties of the expanded tetrafluoroethylene polymers/elastomers.

EXAMPLE 1

JSR Aflas elastomer, a copolymer of propylene and tetrafluoroethylene manufactured by Asahi Glass Company was dissolved in ethyl acetate and diluted with Freon TF, manufactured by DuPont, in about a 10% by weight solution. The diluted elastomer solution was then mixed with poly(tetrafluoroethylene) powder while tumbling. The poly(tetrafluoroethylene) powder is sold under the trade name Fluon CD123 and manufactured by ICI Americas.

About 20 percent mineral spirits lubricant, on the final solid basis, was added to the poly(tetrafluoroethylene)-elastomer mixture. The mixture was exposed to air for solvent evaporation. The final lubricant concentration was controlled at about 12% by weight. The lubricated powder was placed into a cylinder with a core rod in the center. The powder was then compressed to 300 to 500 p.s.i. which forms a solid form called a preform or billet. The preform will be used in future examples.

EXAMPLE 2

The billet of Example 1 was expanded in expansion oven at 400° F. using an expansion rate of close to 10% per second. It was expanded to 1000% of the original length. Its scanning electron microphotograph showed a typical fibril-nodal microstructure with an average internodal distance of about 52 microns. Its water-entry pressure was 0.8 p.s.i. which is indicative of high porosity. The porosity was measured as 83% void.

To make a highly-porous poly(tetrafluoroethylene)-elastomer product, the expanded extrudate was expanded again, using an expansion rate of less than 10% per second. This second expansion was 200% of the original length. This twice-expanded sample was very smooth and highly porous. Its scanning electron microphotograph showed a typical fibril-nodal microstructure with an average internodal distance of about 76 microns.

To manufacture highly-porous material, it is generally difficult to expand it at a very high ratio in a single expansion. The fragile fibrils may not develop completely before breaking. The process of this invention yielded a porous material with most of the fibrils intact. The process is especially applicable to a poly(tetrafluoroethylene)-elastomer material because the premixed, interpenetrated elastomer tends to absorb the stretching energy to make the operation go smoothly during a high-expanding operation.

EXAMPLE 3

Tensile Strength

Tensile strength of a material is a maximum tensile stress, expressed in force per unit cross sectional area of the specimen, which the specimen will withstand without breaking. For porous materials, the cross sectional area of solid polymer within the polymeric matrix is not the cross sectional area of the porous specimen multiplied by the fraction of solid polymer within the cross section. This fraction of solid polymer within the cross section is equivalent to the ratio of the specific gravity of the porous specimen divided by the specific gravity of the solid polymeric material which makes up the force matrix. Thus, for example:

$o$ = Standard tensile strength in psi

-continued $P_1$ = Density of solid polymer, g/cc
$P_2$ = Density of expanded polymer, g/cc $$o_m = \frac{(o)(P_1)}{(P_2)} = \text{Matrix tensile strength}$$

$o = 2500$ psi $P_1 = 2.2 P_2 = .40$ (for solid PTFE) (for expanded PTFE)

$$o_m = \frac{(2500)(2.2)}{(.40)} = 13,750 \text{ psi}$$

Matrix tensile strengths of grafts comprising various blends of polytetrafluoroethylene Aflas elastomer are shown in the following table:

| Polytetra-fluoroethylene Wt. % | Aflas Elastomer Wt. % | Matrix tensile Strength |
| --- | --- | --- |
| 90% | 10% | 6880 |
| 70% | 30% | 4285 |

EXAMPLE 4

An extrudate of 6 mm internal diameter containing 90% poly(tetrafluoroethylene) and 10% elastomer was prepared in accordance with the process of Example 1 and was first expanded in an expansion oven at 400° F. at an expansion rate of about 10% per second. Its expansion was 500% of the original extrudate length, followed by sintering. The sample was smooth and uniform throughout.

The first expanded intermediate product prior to sintering was expanded again at a very slow expansion rate. Its expansion was 125% of the original length. The product was thereafter sintered. It felt smoother than the sample prior to twice-expansion.

The second expansion may function as a fine tuning step orienting the fibrils uniformly as related to the poly(tetrafluoroethylene) nodes. The diameter of the fibrils becomes more consistent, especially upon the addition of an elastomer onto the fibrils. Vascular grafts at 900% expansion have the water-entry pressure of 1.2 p.s.i. in a two-step expansion as compared to 0.8 p.s.i. in a single-step expansion. A test for water entry pressure is illustrated in Example 7.

EXAMPLE 5

The once-expanded extrudates from Example No. 2 were loaded on a sintering rack of 20" in length.
Sample A—20" sample on 20" rack holders
Sample B—20" sample retracted to 10" during sintering
Sample C—20" sample retracted to 8" during sintering.

The expanded extrudates were flash sintered in a sintering oven at 670° F. for 1 minute. As a result of sintering, the fibrils of the poly(tetrafluoroethylene)-elastomer products (Samples B & C) retracted and were fixed during sintering.

Figure 3:
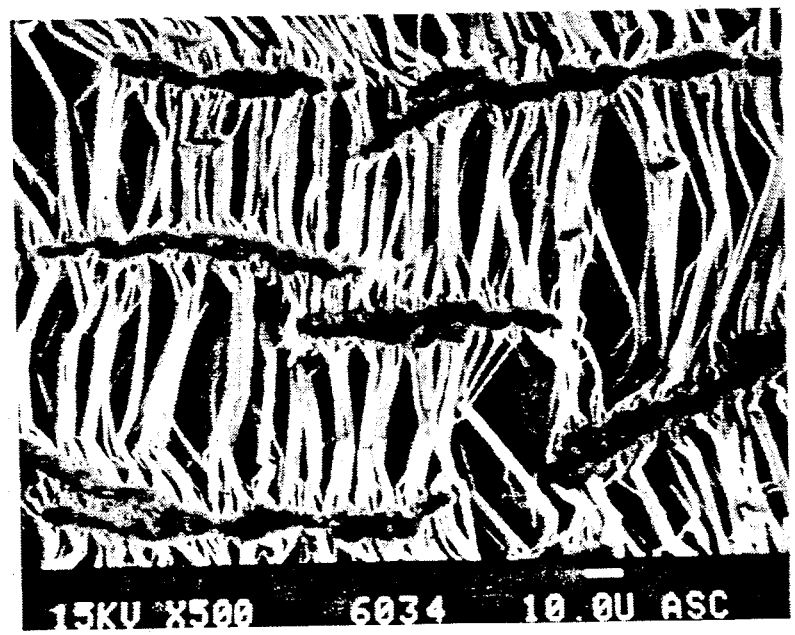
FIGS. 3 through 5 are photomicrographs of products of this invention as shown in the Examples.
Figure 3A:
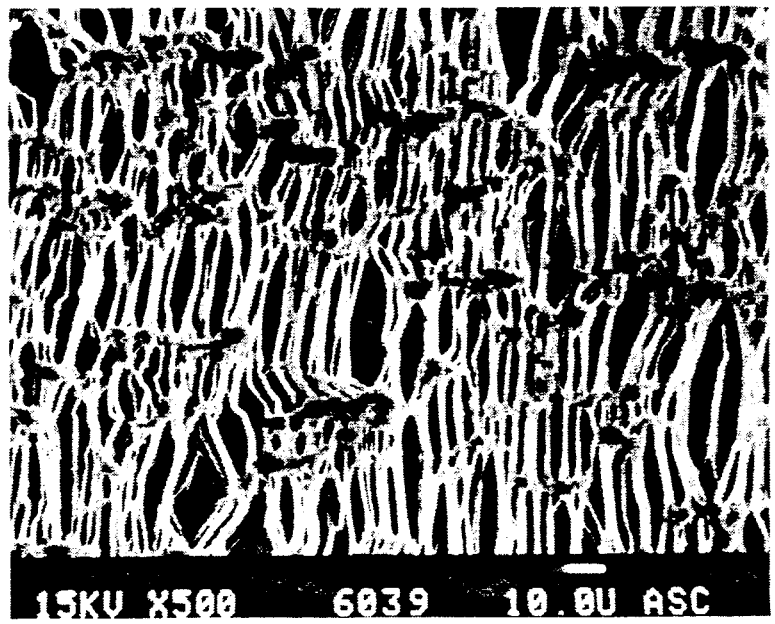
Figure 3B:
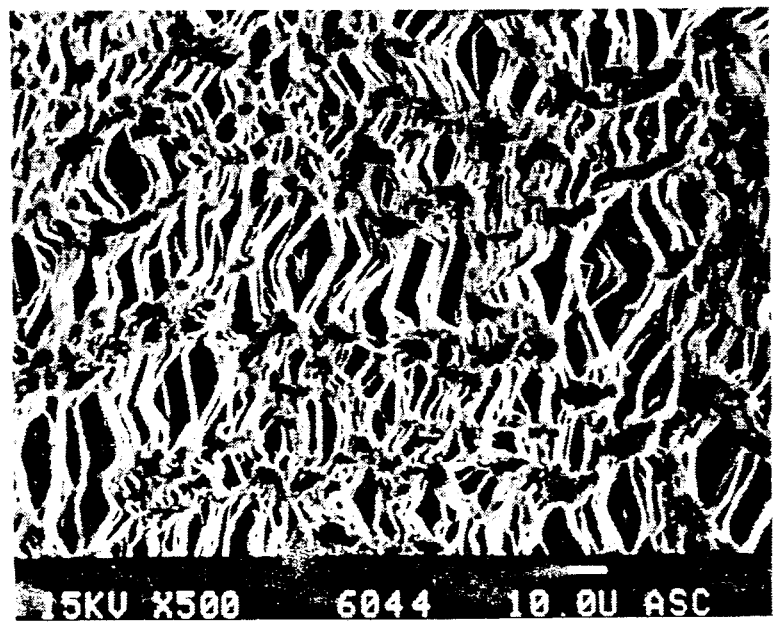

FIGS. 3, 3A and 3B show the scanning electron microphotographs for three samples. The fibrils in Sample A appear straight while the fibrils in Samples B and C are relatively shorter and are wrinkled. The internodal distances were measured as:
Internodal distance for Sample A = 52 microns
Internodal distance for Sample B = 27 microns
Internodal distance for Sample C = 18 microns All three samples appeared very similar microscopically. Their final physical properties relate to the pore sizes and pore shapes of each individual sample.

EXAMPLE 6

Poly(tetrafluoroethylene) extrudates containing 95% poly(tetrafluoroethylene) and 5% Aflas elastomers were prepared in accordance with the process described in Example 1 and expanded as described in the process of Example 4. Three samples were loaded on a sintering rack of 20" in length.
Sample D—20" sample on 20" rack holders
Sample E—20" sample retracted to 15" during sintering
Sample F—20" sample retracted to 10" during sintering.

All three samples were allowed to retract and fix during a sintering process.

EXAMPLE 7

Water Entry Pressure

Water entry pressure is indicative of the effective hydrophobicity of a material under water pressure. Typically, a poly(tetrafluoroethylene) type vascular graft would have a water entry pressure of 3.5 psi or above, preferably ranging from about 3 psi to about 6 psi, to ensure no leakage of blood fluid during blood vessel implantation. The systolic pressure is abut 2.3 psi while the diastolic pressure is about 1.5 psi for an artery.

The water pressure test is as follows:
Equipment: Pulling apparatus with water bath.
1) Cut sample to be tested to the desired length (approximately 2 to 3" long).
2) Place the test sample over brass connector barbs, and stay strap in place.
3) Fill reservoir with tap water.
4) Turn power, water and transducer switches on.
5) Use the regulator attached to the water reservoir to regulate pressure on monitor.
6) Fill the graft sample with water slowly, and zero monitor by allowing a small amount of water to pass through vent port at the other end of the graft sample
7) Increase the pressure slowly until small droplets of water appear on the outside of the graft.
8) Take a reading at this point, and record the number as the water entry pressure.

The Samples D, E and F of Example 6 had the following water entry pressures:
Sample D—5.4 p.s.i.
Sample E—5.9 p.s.i.
Sample F—10.1 p.s.i.

The water-entry pressure data confirms that the retracted poly(tetrafluoroethylene) product (e.g. Sample F) has a tighter microporous structure as shown in Example 6, when compared to a non-retracted poly(tetrafluoroethylene) product.

Retraction promotes the formation of microstructures for a poly(tetrafluoroethylene) product by either expanding x times and sintering as is, or expanding more than x times but sintering when being retracted to x times.

For the product of this invention, sintering under retraction may curve (or wrinkle) poly(tetrafluoroethylene) fibrils instead of shrinking the fibrils. FIG. 3 supports this hypothesis where the fibrils in the product of this invention were curved. The instant process renders the product more flexible. It may also function as a good material to absorb a high hydrodynamic impact (because of its curved or elastic fibrils) when used in fluid transporting applications, such as filters, membranes, or conduits.

EXAMPLE 8

This Example illustrates that catalysts used to cure the elastomer poly(tetraethylene-co-propylene) increase its molecular weight as a result of crosslinking.

Two elastomer samples, one with 2% peroxide (i.e., alpha, alpha'-bis(tert-butylperoxy)-diisopropylbenzene) and 7.5% co-agent TAIC (i.e., triallyl isocyanurate) and another without any catalyst were cured at 330° F. for 30 minutes.

The elastomer sample without catalyst was completely soluble in tetrahydrofuran {THF}, indicating no elastomer crosslinkage. The cured elastomer with catalyst has 23% remain in the solid form when extracted in THF. The GPC chromatograms of the elastomer with catalyst showed a weight-average molecular weight of $2.16 \times 10_5$ over the control elastomer sample without catalyst of $1.92 \times 10_5$.

The addition of catalysts into elastomer improves its crosslinking properties. Post curing the elastomer at 450° F. for 16 hours improves its desired property of compression set resistance even further.

EXAMPLE 9

Extrudates were made in accordance with the process of Example 1 containing 10 wt % elastomer, 90 wt % poly(tetrafluoroethylene) and a catalyst system of 2 wt % peroxide (alpha, alpha'-bis(tert-butylperoxy)diisopropylbenzene) and 7.5 wt % co-agent TAIC (triallyl isocyanurate) on an elastomer basis wherein the catalyst system evaporated after the sintering step. The extrudates were tied and loaded onto the rack of an expansion oven. The initial length of the extrudates prior to expansion was 4 inches. The extrudates were expanded at 200° F. at an expansion rate of about 10% per second. The 400% expanded intermediates products were subject to a curing process of 350° F. for 30 minutes, followed by 450° F. for 16 hours. One of said products was flash sintered and coded Sample G.

One of the unsintered products from the above was re-expanded 100% at 200° F. and thereafter sintered. This sample H, was smooth and porous which is 900% expanded (1000% of the original length).

Figure 4:
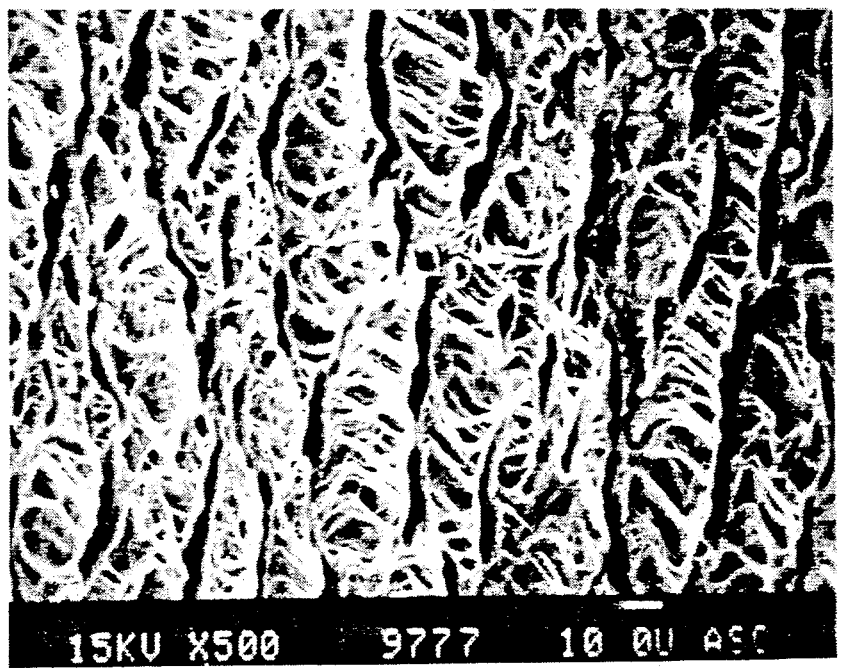

FIG. 4 shows the SEM lumen surface for Sample G. The fibers are very dense. The fiber voids are not as sparse as those from the product not containing the catalyst. A good comparison is between FIG. 5 (product with a catalyst) and FIG. 3 (product without any catalyst) at the same expansion ratio. During elastomer curing, the elastomer forms its own interconnected fibers, covering more interfibril voids and making the fibrilal voids less sparse. This contributes to desired compliances for a vascular graft. Sample G shows a compliance of $1.35 \times 10^{-2}$%/mmHg while a control Impra II poly(tetrafluoroethylene)vascular graft showed a compliance of $0.35 \times 10^{-2}$%/mmHg.

Figure 5:
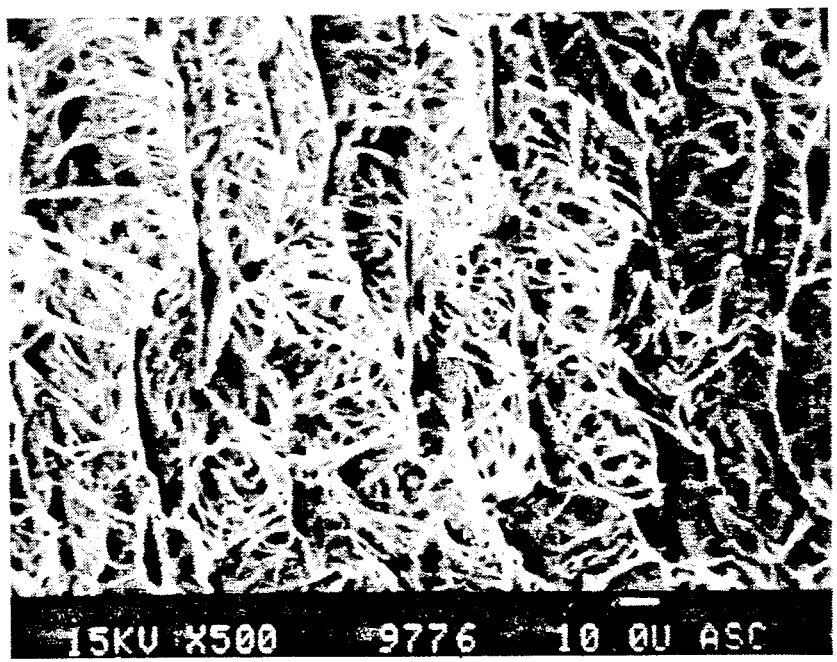

FIG. 5 shows the scanning electron microphotograph lumen surface for Sample H. Though Sample H was re-expanded product from Sample G, the basic fibril-nodal microstructure is not much different between the two samples. Sample G has a water pressure of 1.3 psi while that for Sample H is 1.2 psi. Sample H showed a compliance of $2.8 \times 10^{-2}$%/mmHg which is about double of Sample G.

While the preferred embodiments have been described, various modifications and substitutions may be made thereto without departing from the scope of the invention. Accordingly, it is to be understood that the invention has been described by way of illustration and not limitation.

What is claimed is:

1. A process of preparing a polytetrafluroethylene-elastomer microporous substrate comprising the steps of:
    forming said substrate from a blend of polytetrafluoroethylene and an elastomer;
    heating said substrate to a temperature, and for a period of time which will not cause said elastomer to become cured;
    expanding said heated substrate to a first expanded position;
    maintaining said substrate in said first expanded position;
    heating said substrate to a temperature for a sufficient period of time for curing said elastomer but that will not effect sintering of said polytetrafluoroethylene;
    raising the temperature of said substrate for a sufficient period of time to flash sinter said polytetrafluoroethylene while allowing the substrate to assume a second expanded position.

2. The process of claim 1 wherein said substrate is allowed to assume said second expanded position by performing a second step of expanding said substrate between said step of curing and flash sintering.

3. The process of claim 2 further including a second step of maintaining said substrate in said second expanded position before said step of flash sintering is performed.

4. The process of claim 1 wherein said first step of heating is performed to uniformly heat said substrate to said temperature below said elastomer curing temperature.

5. The process of claim 1 further including a step of preparing said polytetrafluroethylene-elastomer blend, with said elastomer comprising from about ten to thirty weight percent of said blend.

6. The process of claim 3 further including a step of preparing said polytetrafluroethylene-elastomer blend, with said elastomer comprising from about ten to thirty weight percent of said blend.

7. A process of forming a vascular graft comprising the steps of:
    forming a tubular structure from a blend of polytetrafluoroethylene and at least one elastomer;
    heating said tubular structure to a temperature below said elastomer curing temperature;
    expanding said tubular structure to a first expanded state;
    maintaining said tubular structure in said first expanded state;
    curing said elastomer;
    and flash sintering said polytetrafluoroethylene while allowing said tubular structure to assume a second expanded position.

8. The process of claim 7 wherein said tubular structure is allowed to assume a second expanded position by releasing said tubular structure from said first expanded position prior to said sintering step.

9. The process of claim 7 wherein said tubular structure is allowed to assume a second expanded position by maintaining said tubular structure completely or partially in said first expanded position before said step of flash sintering is performed.

10. The process of claims 8 or 9 wherein said step of heating is performed to uniformly heat said tubular structure to said temperature below said elastomer curing temperature.

11. The process of claims 10 further including a step of preparing said polytetrafluroethylene-elastomer blend, with said elastomer comprising from about ten to thirty weight percent of said blend.

12. The process of claims 11 further including a step of preparing said polytetrafluroethylene-elastomer blend, with said elastomer comprising from about ten to thirty weight percent of said blend.

13. The process of claims 12 wherein said step of expanding of said tubular structure is performed by expanding said tubular structure in the longitudinal or radially direction, or both directions.

14. The process of claim 13 wherein said expanding step is performed to expand said tubular structure at a rate of about ten to about one-hundred percent per second and to a ratio of about two-hundred to about six-hundred percent of said tubular structure original length.

15. The process of claim 13 wherein said expanding step is performed to expand said tubular structure at a rate of about ten to about fifty percent per second and to a ratio of about two-hundred to about three-hundred percent of said tubular structure original length.

16. The process of claim 15 wherein said polytetrafluroethylene-elastomer blend is formed with from about ten to about thirty percent elastomer.

17. The process of claim 7 further including a second step of expanding said tubular structure between said step of curing and flash sintering.

18. The process of claim 17 wherein said tubular structure is released from said second expanded position prior to said sintering step.

19. The process of claim 17 wherein said tubular structure is completely or partially maintained in said second expanded position during said sintering step.

20. The process of claims 18 or 19 further including a step of preparing said polytetrafluroethylene-elastomer blend, with said elastomer comprising from about ten to thirty weight percent of said blend.

21. The process of claim 20 wherein said step of expanding of said tubular structure is performed by expanding said tubular structure in the longitudinal or radially direction, or both directions.

22. The process of claim 21 wherein said expanding step is performed to expand said tubular structure at a rate of about ten to about one-hundred percent per second and to a ratio of about two-hundred to about six-hundred percent of said tubular structure original length.

23. The process of claim 22 wherein said expanding step is performed to expand said tubular structure at a rate of about ten to about fifty percent per second and to a ratio of about two-hundred to about three-hundred percent of said tubular structure original length.

* * * * *